United States Patent
van Riel et al.

(10) Patent No.: US 10,496,555 B2
(45) Date of Patent: Dec. 3, 2019

(54) IMPLEMENTING PER-THREAD MEMORY ACCESS PERMISSIONS

(71) Applicant: Red Hat, Inc., Raleigh, NC (US)

(72) Inventors: Henri van Riel, Westford, MA (US); Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 60 days.

(21) Appl. No.: 15/592,843

(22) Filed: May 11, 2017

(65) Prior Publication Data

US 2018/0329835 A1    Nov. 15, 2018

(51) Int. Cl.
| | | |
|---|---|---|
| G06F 12/14 | (2006.01) | |
| G06F 12/0802 | (2016.01) | |
| G06F 9/46 | (2006.01) | |
| G06F 12/06 | (2006.01) | |
| G06F 9/34 | (2018.01) | |

(52) U.S. Cl.
CPC .......... *G06F 12/1475* (2013.01); *G06F 9/46* (2013.01); *G06F 12/0802* (2013.01); *G06F 12/1408* (2013.01); *G06F 12/1466* (2013.01); *G06F 9/342* (2013.01); *G06F 12/06* (2013.01)

(58) Field of Classification Search
CPC .... G06F 9/46; G06F 12/0802; G06F 12/1408; G06F 12/1466
USPC ................................................ 711/163, 164
See application file for complete search history.

(56) References Cited

U.S. PATENT DOCUMENTS

| | | | |
|---|---|---|---|
| 5,627,987 A | 5/1997 | Nozue et al. | |
| 7,337,291 B2 | 2/2008 | Abadi et al. | |
| 8,010,763 B2 | 8/2011 | Armstrong et al. | |
| 9,372,989 B2* | 6/2016 | Grystan | G06F 21/566 |
| 9,432,270 B2* | 8/2016 | Degioanni | H04L 43/045 |
| 9,892,256 B1* | 2/2018 | Lango | G06F 21/6218 |
| 2004/0064577 A1* | 4/2004 | Dahlin | H04L 29/06 709/235 |
| 2008/0155537 A1* | 6/2008 | Dinda | G06F 9/4887 718/1 |
| 2009/0083263 A1* | 3/2009 | Felch | G06F 9/3851 |
| 2013/0132690 A1* | 5/2013 | Epstein | G06F 12/1416 711/159 |

(Continued)

OTHER PUBLICATIONS

"Firejail—A Security Sandbox for Mozilla Firefox, Part 1", Firejail—A Security Sandbox for Mozilla Firefox, Part 1 | I3net—a layer 3 networking blog, https://I3net.wordpress.com/2014/09/19/firejailasecuritysandboxformozillatirefox/, Mar. 6, 2017, 37 pages.

(Continued)

*Primary Examiner* — Tuan V Thai
*Assistant Examiner* — Edward Waddy, Jr.
(74) *Attorney, Agent, or Firm* — Lowenstein Sandler LLP (57) ABSTRACT

Disclosed are systems and methods of implementing per-thread granular memory access permissions. An example method may include: initializing a plurality of memory protection keys associated with a plurality of page table entries associated with an address space of a processing thread; loading, to a protection key rights register associated with the processing thread, a plurality of memory access permissions referenced by the memory protection keys; initializing a system call filter to prevent the processing thread from modifying the protection key rights register; and causing the processing thread to be executed.

14 Claims, 6 Drawing Sheets

(56) References Cited

U.S. PATENT DOCUMENTS

2015/0020074 A1    1/2015   Krishnasamy et al.
2016/0048688 A1*   2/2016   Flynn .................. G06F 21/6281
                                                      713/193
2017/0286326 A1*  10/2017   Guim .................. G06F 12/1009
2018/0218148 A1*   8/2018   D'Errico ................ G06F 21/53

OTHER PUBLICATIONS

Safayet, Ahmed, "Kernel Keyring Service", http://www.saout.de/pipermail/dmcrypt/2014December/004525.html 1, Dec. 17, 2014, 5 pages.

* cited by examiner

IMPLEMENTING PER-THREAD MEMORY ACCESS PERMISSIONS

TECHNICAL FIELD

The present disclosure is generally related to computer systems utilizing virtual memory, and more particularly, to implementing thread-level memory access permissions.

BACKGROUND

Virtualization may be viewed as abstraction of some physical components into logical objects in order to allow running, for example, various operating systems concurrently and in isolation from other operating systems on one or more interconnected physical computer systems. Virtualization allows, for example, consolidating multiple physical servers into one physical server running multiple virtual machines in order to improve the hardware utilization rate. Virtualization may be achieved by running a layer, often referred to as "hypervisor," above the hardware and below the virtual machines. The hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the Figures, in which.

DETAILED DESCRIPTION

Disclosed herein are systems and methods of implementing per-thread granular memory access permissions.

Common memory protection mechanisms do not always provide the thread-level granularity in defining memory access permissions. The systems and methods of the present disclosure alleviate these and other deficiencies of conventional memory protection methods by employing a combination of per-thread memory protection keys and system call filters designed to prevent the thread from modifying the memory protection keys.

Certain reserved bits of each page table entry may be utilized to store a value of a memory protection key, which may act as an index to a thread-local protection key rights register. The protection key rights register may store a plurality of memory access permission bit masks, such that each bit of a bit mask may be set or cleared to inhibit or allow the current processing thread to perform a certain memory access operation with respect to the memory page associated with the bit mask by the value of the memory protection key. Thus, every linear address becomes associated with a protection key, which is stored in the reserved bits of the page table entry associated with the memory page that includes the linear address.

The above-described mechanism allows implementing per-thread memory access permissions by loading, at the thread initialization time, protection key values to the thread-specific protection key rights register. In order to prevent the thread from modifying the memory protection register, appropriate system call filters may be installed at the thread initialization time, as described in more detail herein below.

Thus, the systems and methods described herein represent improvements to the functionality of general purpose or specialized computing devices, by implementing per-thread granular memory access permissions. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

Figure 1:
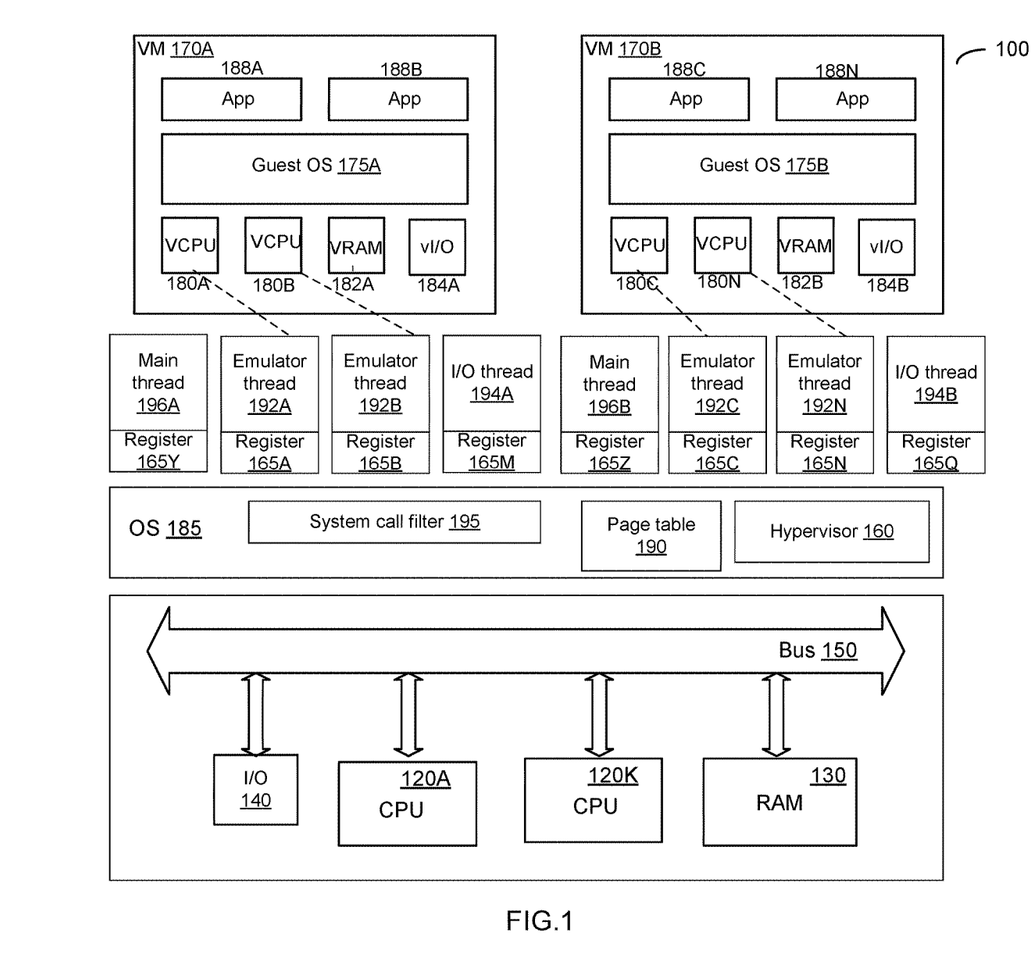
FIG. 1 depicts a high-level component diagram of an illustrative example of a computer system 100 operating in accordance with one or more aspects of the present disclosure.

In an illustrative example, per-thread granular memory access permissions may be implemented in a virtualized system, in which the hypervisor creates a plurality of processing threads for emulating the virtual processors. FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

Examples of "processors" (also referred herein as "processing devices" or CPUs) include various devices that are capable of executing instructions encoding arithmetic, logical, or I/O operations. In an illustrative example, a processor may follow Von Neumann architectural model and may include an arithmetic logic unit (ALU), a control unit, and a plurality of registers. In another aspect, a processor may be a single core processor which is capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

Examples of "memory devices" include volatile or non-volatile memory devices, such as RAM, ROM, EEPROM, or any other devices capable of storing data. Examples of "I/O devices" include devices providing an interface between a processor and an external device capable of inputting and/or outputting binary data.

Computer system 100 may run one or more virtual machines 170A-170N, by executing a virtual machine manager 160, often referred to as "hypervisor," above the hardware and below the virtual machines, as schematically illustrated by FIG. 1. In one illustrative example, the hypervisor 160 may be a component of operating system 185 executed by the host computer system 100. Alternatively, the hypervisor 160 may be provided by an application running under the host operating system 185, or may run directly on the host computer system 100 without an operating system beneath it. The hypervisor 160 may abstract the physical layer, including the processors 120, the memory 130, and the I/O devices 140, and present this abstraction to the virtual machines 170A-170N as virtual devices. A virtual machine 170 may execute a guest operating system 175 which may utilize the underlying virtual processors (also referred to as virtual central processing units (vCPUs)) 180, the virtual memory 182, and the virtual I/O devices 184. One or more guest applications 188A-188N may be running on a virtual machine 170 under a guest operating system 175. Guest operating system and guest applications are collectively referred to herein as "guest software."

In certain implementations, processor virtualization may be implemented by the hypervisor's scheduling time slots on one or more physical processors for virtual processors. In an illustrative example, each virtual processor 180A-180N may be implemented by a respective vCPU emulator processing thread 192A-192N that may be scheduled to run on one of the host physical processors. The state of each emulator processing thread 192A-192N may include a respective memory protection key register 165A-165N. In order to prevent each of the processing threads from modifying the respective memory protection register, appropriate system call filters 195 may be installed at the thread initialization time, as described in more detail herein below.

Device virtualization may be implemented by intercepting virtual machine memory read/write and/or input/output (I/O) operations with respect to certain memory and/or I/O port ranges, and by routing hardware interrupts to a virtual machine associated with the corresponding virtual device. In certain implementations, one or more I/O processing threads may be employed to process I/O requests on behalf of the virtual machines 170A-170B. The state of each I/O thread 194A-194B may include a respective memory protection key register 165M-165Q.

The emulator processing threads 192A-192B and the I/O processing thread 194A associated with the virtual machine 170A may be coordinated by the main processing thread 196A, the state of which may include a memory protection key register 165Y. The emulator processing threads 192C-192N and the I/O processing threads 194B associated with the virtual machine 170B may be coordinated by the main processing thread 196B, the state of which may include a memory protection key register 165Z.

Memory virtualization may be implementing by a paging mechanism allocating the host RAM to virtual machine memory pages and swapping the memory pages to a backing storage when necessary. The paging mechanism may employ hierarchical page tables 190 for translating linear memory addresses to physical memory addresses. In various implementations, paging mechanism may map linear addresses to page frames of various sizes, e.g., 4K byte pages, 2M byte pages, or 1G byte pages.

Figure 2:
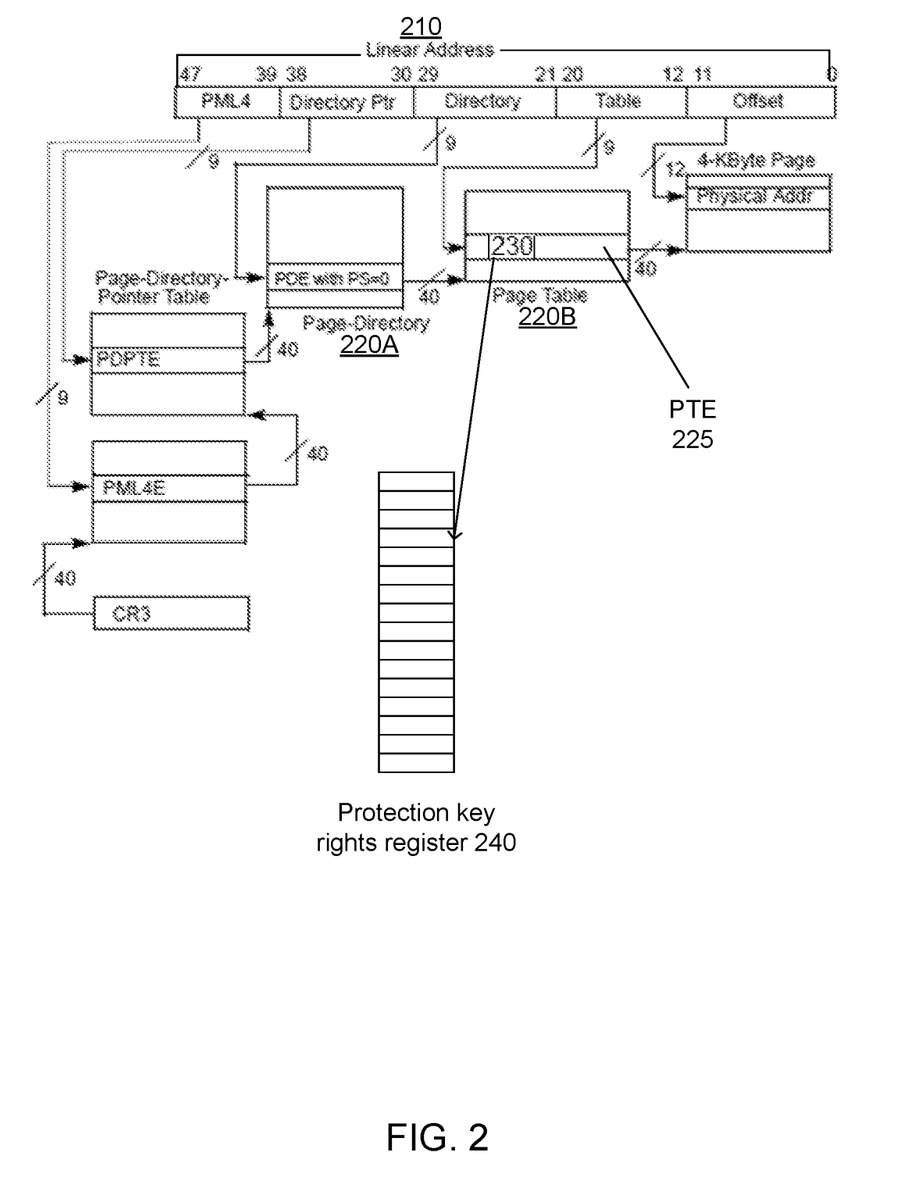
FIG. 2 schematically illustrates hierarchical page table structure which may be employed by systems and method operating in accordance with one or more aspects of the present disclosure.

FIG. 2 schematically illustrates hierarchical page table structure employed to map linear addresses to 4K byte pages. As schematically illustrated by FIG. 2, translating a linear address 210 may be performed by an iterative procedure (referred to as "page table walk") which involves utilizing a portion of the linear address (starting with the uppermost bits) to index a page table, such as the page directory 220A in order to identify a page table entry. If the identified page table entry references another page table 220B, that page table is indexed using a portion of the linear address which immediately below the portion that was used to index the previous page table. The page walk procedure is complete when the identified page table entry 225 references a memory frame. The remaining lower portion of the linear address specifies the offset within that memory frame.

As noted herein above, certain reserved bits 230 of the page table entry 225 may be utilized to store a memory protection key, which may act as an index to a thread-local protection key rights register 240. The protection key rights register 240 may determine, for each protection key, how software can access linear addresses associated with that protection key. The protection key rights register may store a plurality of memory access permission bit masks, such that each bit of a bit mask may be set or cleared to inhibit or allow the current processing thread to perform a certain memory access operation with respect to the memory page. In certain implementations, each bit mask may comprise two bits: "Access Disable" (AD) bit and "Write disable" (WD) bit. If the access disable of i-th bit mask bit is set, the processor prevents any data accesses to user-mode linear addresses associated with a protection key having the value of i. If the write disable of i-th bit mask bit is set, the processor prevents write accesses to user-mode linear addresses associated with a protection key having the value of i. In various other implementations, other bit masks (e.g., read-write-execute (RWX) triplets) may be employed to implement the methods described herein.

Figure 3:
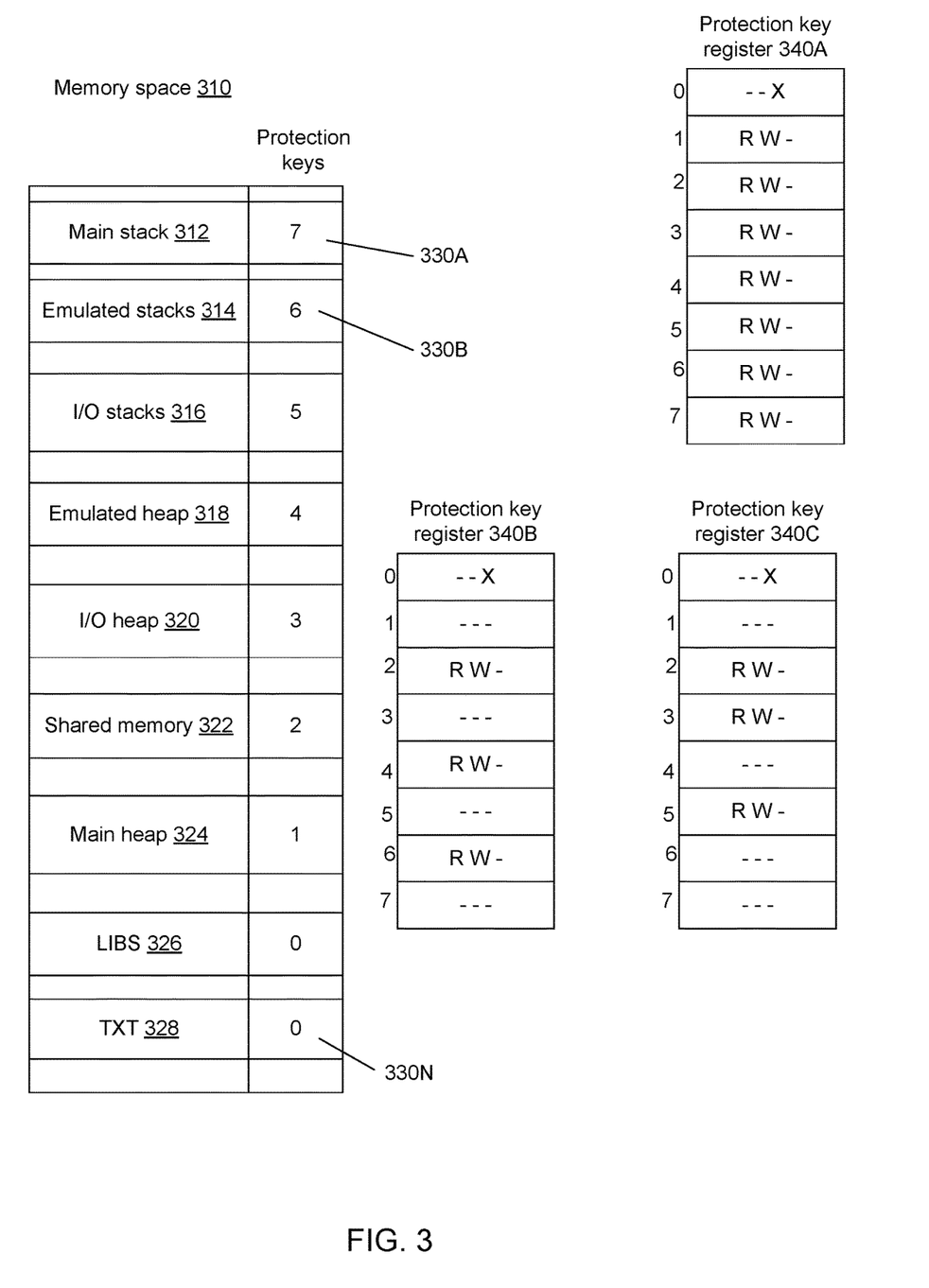
FIG. 3 schematically illustrates an illustrative example of a memory map and associated per-thread values of protection key rights registers for a virtualized computer system, in accordance with one or more aspects of the present disclosure.

FIG. 3 schematically illustrates an illustrative example of a memory map and associated per-thread values of protection key rights registers for a virtualized computer system, in accordance with one or more aspects of the present disclosure. As schematically illustrated by FIG. 3, the memory space 310 may include the main stack 312, one or more emulated (per-vCPU) stacks 314, one or more I/O stacks 316, an emulated heap 318, an I/O heap 320, a shared memory region 322, a main heap 324, a loadable libraries memory region 326, and a code memory region 328. A global paging structure may employ reserved page table entry bits to assign the memory protection keys 330A-330N to each of the memory regions of the memory space 310. As noted herein above, each protection key 330 may act as an index to a thread-local protection key rights register 340A-340Z.

Each protection key rights register 340 may store a plurality of memory access permission bit masks, such that each bit of a bit mask may be set or cleared to inhibit or allow the current processing thread to perform a certain memory access operation with respect to the memory page. A hypervisor may create and run a main thread, a plurality of emulator threads associated with respective vCPUs and a plurality of I/O threads servicing I/O requests no behalf of the virtual machines. Upon creating a thread, the parent process (e.g., the hypervisor) may initialize its protection key rights register 340, so that the thread would only be able to access or modify certain regions of the memory space 310. In an illustrative example, the protection key rights register 340A associated with the main thread 196A may specify execute permissions with respect to the loadable libraries memory region 326 and a code memory region 328, read-write permissions with respect to emulated stacks 314, I/O stacks 316, and the shared memory region 322, while allowing no access to other regions of the memory space 310. In another illustrative example, the protection key rights register 340B associated with a vCPU emulator thread 192A-192N may specify execute permissions with respect to code memory region 328, read-write permissions with respect to the shared memory region 322, the emulated heap 318, and emulated stacks 314, while allowing no access to other regions of the memory space 310. In another illustrative example, the protection key rights register 340C associated with an I/O thread 194A-194B may specify execute permissions with respect to code memory region 328, read-write permissions with respect to the shared memory region 322, the I/O heap 320, and I/O stacks 316, while allowing no access to other regions of the memory space 310.

In order to prevent the thread from modifying the memory protection register, the parent process (e.g., the hypervisor) may install, at the thread initialization time, one or more system call filters to prevent the thread from executing certain system calls. In one illustrative example, the secure computing (seccomp) filtering mechanism may be employed to specify a Berkeley packet filter (BPF) to intercept the system calls issued by the processing thread. The BPF may inspect the system call parameters, e.g., the contents of system registers, and may allow or disallow an intercepted system call to proceed based on matching values certain system call parameters to value specified by one or more filtering rules.

A filtering rule may define actions to be taken by the system with respect to a particular system call. In certain implementations, a filtering rule may be defined to apply to a particular system call and certain argument values. In an illustrative example, a filtering rule may restrict a particular system call to only using certain values for system call arguments.

Responsive to determining that a system call is inhibited by an active system call filter, the processor may perform, with respect to the processing thread which has initiated the system call, certain actions that are defined by an applicable filtering rule. In certain implementations, the processor may issue a pre-defined signal to the processing thread which initiated the system call intercepted by the system call filter. In an illustrative example, the processor may issue a SIGILL signal indicating that the processing thread attempted to execute a malformed, unknown, or privileged instruction. In another illustrative example, the processor may issue a SIGKILL signal causing the processing thread to terminate immediately. In another illustrative example, the processor may issue a SIGTERM signal requesting the processing thread termination. In another illustrative example, the processor may issue a SIGUSRn signal indicating a user-defined condition. In another illustrative example, the processor may issue a SIGSYS signal indicating that the processing thread attempted to pass a bad argument to a system call.

In certain implementations, the processor may, responsive to determining that a system call is inhibited by an active system call filter, return a certain error code to the processing thread and/or generate a system trace event. Other types of actions to be performed by the processor with respect to the processing thread which initiated the system call intercepted by an active system call filter may be prescribed by the applicable filtering rules.

In various illustrative examples, the system call filters applied to the I/O and emulator processing threads may prevent the processing thread from modifying the protection key rights register, open or close files, map or unmap memory ranges, and/or perform various other operations that may compromise the virtualized system integrity.

While some of the examples described herein above are related to virtualized systems, the methods of implementing thread-level memory access permissions described herein may also be applicable to various non-virtualized systems.

Figure 4:
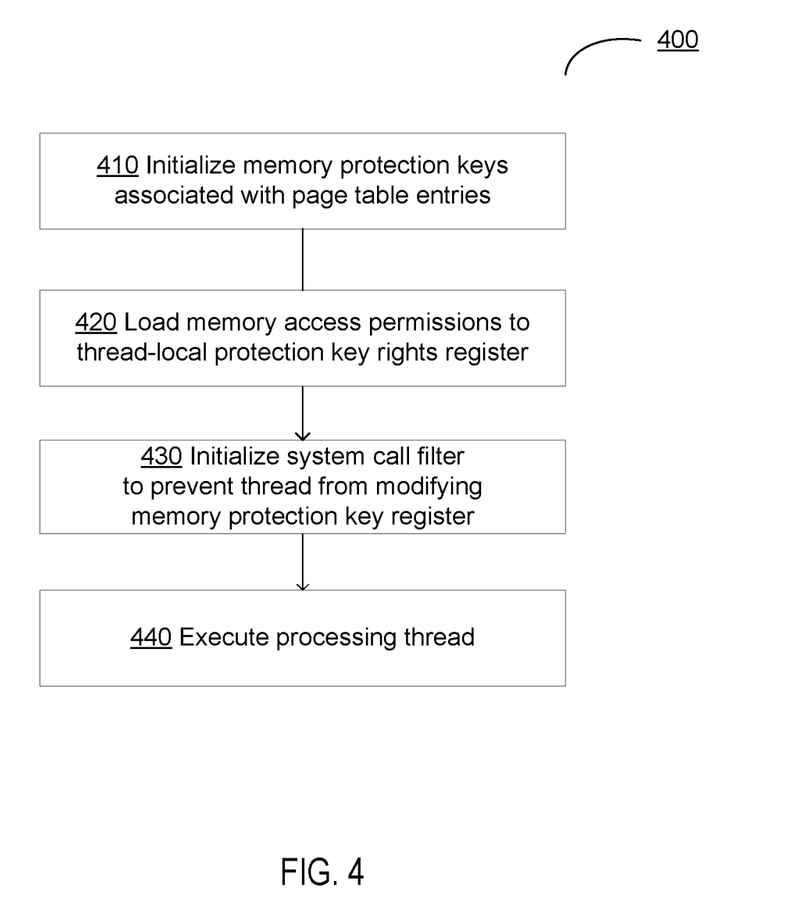
FIG. 4 is a flow diagram of an example method of implementing thread-level memory access permissions, in accordance with one or more aspects of the present disclosure.

FIG. 4 is a flow diagram of an example method of implementing thread-level memory access permissions, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 500-600 of FIGS. 5-6) implementing the method. In an illustrative example, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

Referring to FIG. 4, at block 410, a processing device implementing the method may initialize memory protection keys associated with a plurality of page table entries. A page table entry may associate a linear address of an address space of a processing thread to a physical address. A memory protection key may be stored in reserved bit positions of the page table entry. In various illustrative examples, the processing thread may be represented by a main processing thread, an input/output (I/O) processing thread, or a virtual processor emulator processing thread, as described in more detail herein above.

At block 420, the processing device may load, to the protection key rights register associated with the processing thread, a plurality of memory access permissions referenced by the memory protection keys. A memory access permission may be represented by a bit mask including one or more bits, such that each bit indicates a permission for the processing thread to perform a certain memory access operation with respect to a memory region referenced by the page table entry that includes a memory protection key indicating the position of the bit mask in the memory protection register, as described in more detail herein above.

At block 430, the processing device may initialize a system call filter to prevent the processing thread from modifying the memory protection register. In various illustrative examples, the system call filters may prevent the thread from modifying the protection key rights register, open or close files, map or unmap memory ranges, and/or perform various other operations that may compromise the virtualized system integrity, as described in more detail herein above.

At block 440, the processing device may cause the processing thread to be executed. During the thread lifetime, the system call filter may intercept system calls issued by the processing thread. Responsive to intercepting a system call, the system call filter may inspect values of one or more system call parameters (e.g., values stored by one or more system registers). Responsive to matching the values of one or more system call parameters to values specified by one or more filtering rules, the system call filter may further terminate the processing thread, issue a certain signal to the processing thread, return a certain error code to the processing thread, or generating a system trace event, as described in more detail herein above.

Figure 5:
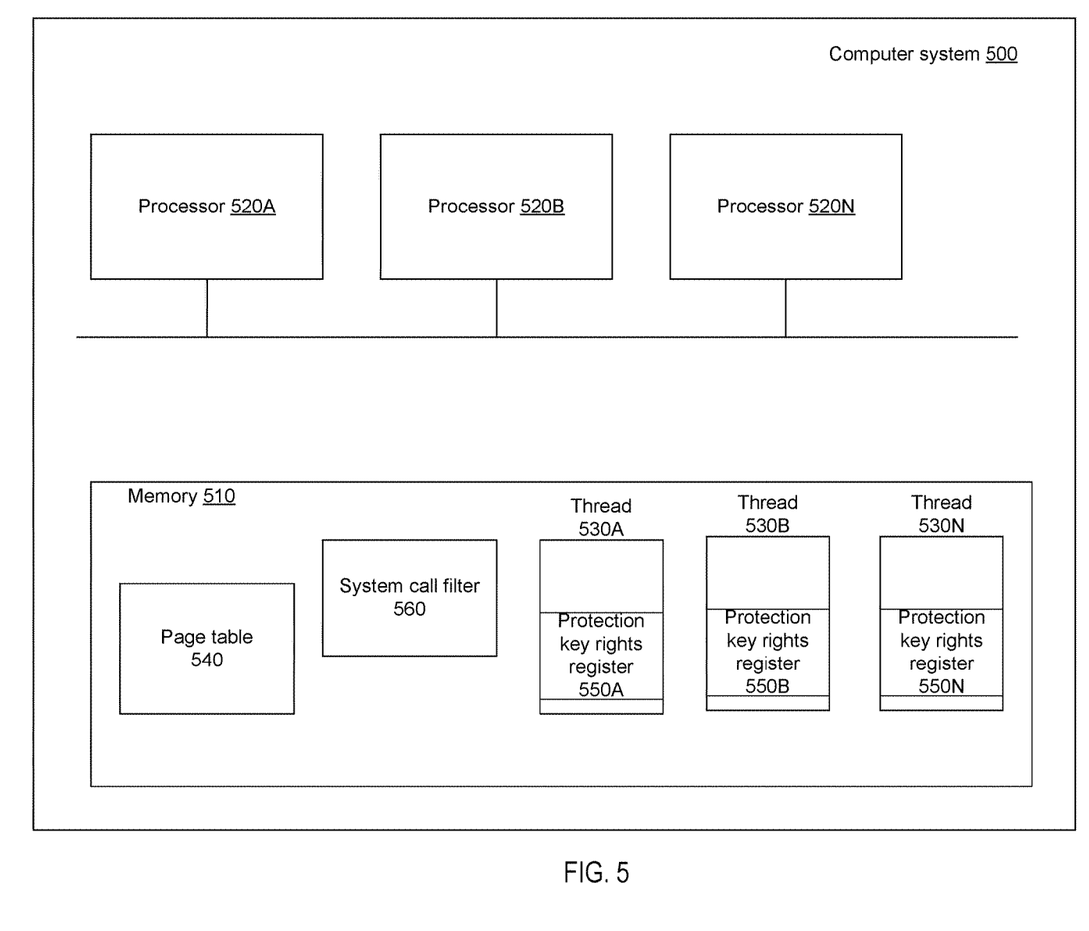
FIG. 5 depicts a block diagram of an illustrative computer system operating in accordance with one or more aspects of the disclosure.

FIG. 5 depicts a block diagram of an illustrative computer system 500 operating in accordance with one or more aspects of the disclosure. In various illustrative examples, computer system 500 may be represented by computer system 100 of FIG. 1. Computer system 500 comprises a memory 510 and one or more physical processors 520A-520N, that are operatively coupled to the memory 510 and execute the code of processing threads 530A-530N (e.g., emulator processing threads 192A-192N, I/O processing threads 194A-194B, or main processing threads 196A-196B of FIG. 1). The memory may store the page table 540 and the state of each thread 530A-530N. As noted herein above, each thread state may include the thread-local protection key rights register 550. The memory may further store the system call filter 560 to prevent each of the processing threads from modifying the respective memory protection key register 550, as described in more details herein above.

Figure 6:
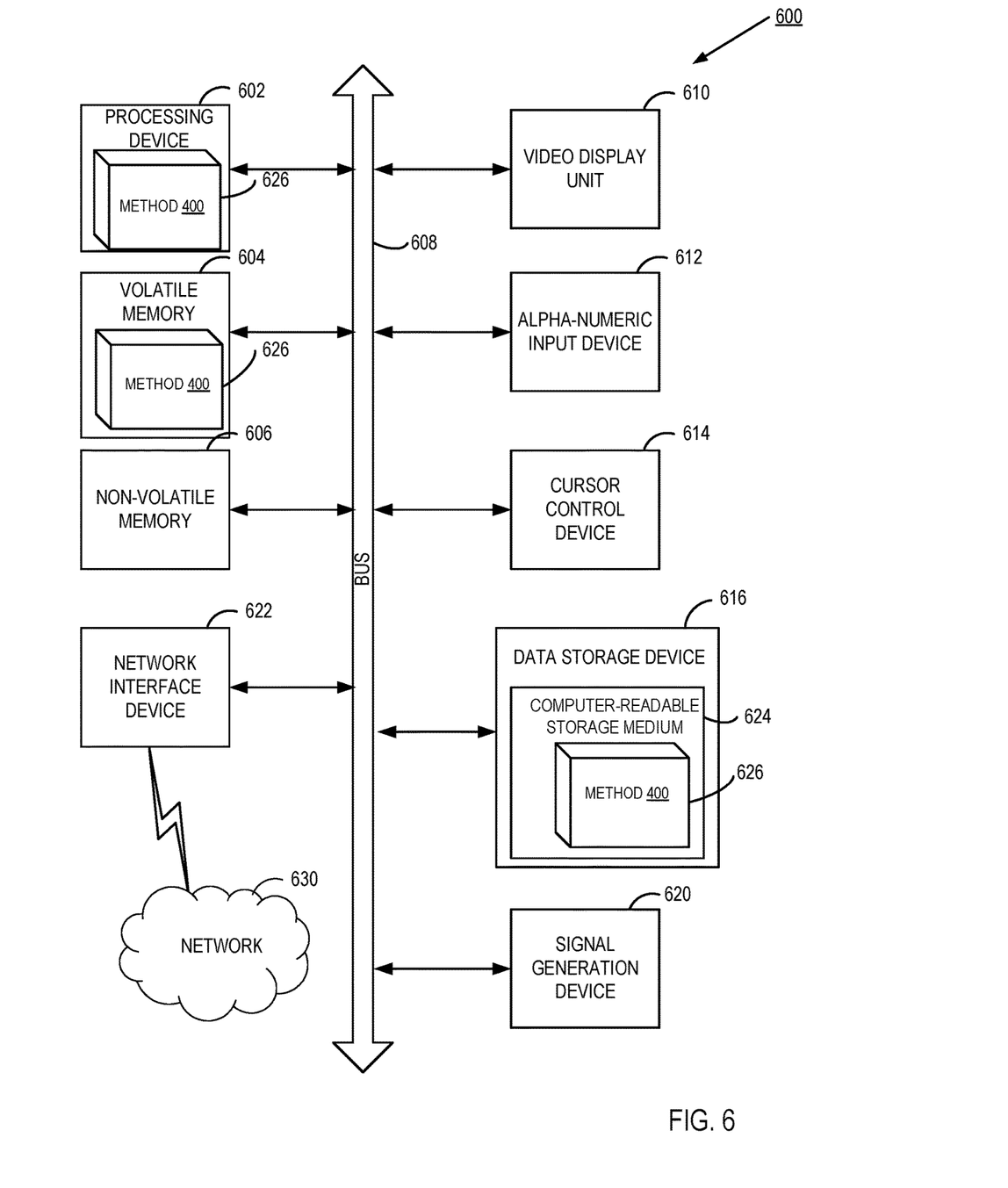
FIG. 6 depicts a block diagram of another illustrative computer system operating in accordance with one or more aspects of the disclosure.

FIG. 6 depicts a block diagram of another illustrative computer system 600 operating in accordance with one or more aspects of the disclosure. In various illustrative examples, computer system 600 may correspond to the computer system 100 of FIG. 1. In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 400 of implementing thread-level memory access permissions.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "reading," "setting," "detecting," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 of implementing thread-level memory access permissions and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
    initializing, by a processing device, a plurality of memory protection keys associated with a plurality of page table entries associated with an address space of a main processing thread of a hypervisor, wherein the main processing thread coordinates an emulator processing thread associated with a virtual machine managed by the hypervisor;
    loading, to a first protection key rights register associated with the main processing thread, a first plurality of memory access permissions, wherein the first plurality of memory access permissions comprise an execute permission with respect to a loadable library memory region and a code memory region, a read-write permission with respect to an emulated stack, a read-write permission with respect to an I/O stack, and a read-write permission with respect to a shared memory region;
    loading, to a second protection key rights register associated with the emulator processing thread, a second plurality of memory access permissions, wherein the second plurality of memory access permissions include an execute permission with respect to the code memory region, a read-write permission with respect to the shared memory region, a read-write permission with respect to an emulated heap, and a read-write permission with respect to the emulated stack;
    initializing a system call filter to prevent the main processing thread from modifying the first protection key rights register;
    causing the main processing thread to be executed; and
    responsive to intercepting a system call by the system call filter, matching a value of a system call parameter to a value specified by a filtering rule.

2. The method of claim 1, wherein a protection key is stored in reserved bit positions of a page table entry of the plurality of page table entries.

3. The method of claim 1, wherein each memory access permission of the first plurality of memory access permissions comprises a bit mask including one or more bits, wherein each bit indicates a permission for the main processing thread to perform a defined memory access operation with respect to a memory region referenced by a page table entry that comprises a memory protection key indicating a position of the bit mask in the first protection key rights register.

4. The method of claim 3, wherein the defined memory access operation is identified by a position of the bit within the bit mask.

5. The method of claim 1, wherein each memory access permission of the first plurality of memory access permissions comprises a bit mask including one or more bits, wherein each bit disables the processing thread to perform a defined memory access operation with respect to a memory region referenced by a page table entry that comprises a memory protection key indicating a position of the bit mask in the first protection key rights register.

6. The method of claim 1, further comprising:
    responsive to intercepting a system call by the system call filter, performing at least one of: terminating the main processing thread, issuing a defined signal to the main processing thread, returning a defined error code to the main processing thread, or generating a system trace event.

7. The method of claim 1, wherein the system call filter is provided by a secure computing (seccomp) filter.

8. The method of claim 1, wherein the system call filter is provided by a Berkeley packet filter (BPF).

9. A computer system, comprising:
    a memory to store a paging table comprising a plurality of page table entries; and
    a processing device, operatively coupled to the memory, to:
        initialize a plurality of memory protection keys associated with the plurality of page table entries associated with an address space of a main processing thread of a hypervisor, wherein the main processing thread coordinates an emulator processing thread associated with a virtual machine managed by the hypervisor;
        load, to a first protection key rights register associated with the main processing thread, a first plurality of memory access permissions, wherein the first plurality of memory access permissions comprise an execute permission with respect to a loadable library memory region and a code memory region, a read-write permission with respect to an emulated stack, a read-write permission with respect to an I/O stack, and a read-write permission with respect to a shared memory region;
        load, to a second protection key rights register associated with the emulator processing thread, a second plurality of memory access permissions, wherein the second plurality of memory access permissions include an execute permission with respect to the code memory region, a read-write permission with respect to the shared memory region, a read-write permission with respect to an emulated heap, and a read-write permission with respect to the emulated stack;
        initialize a system call filter to prevent the main processing thread from modifying the first protection key rights register;
        cause main the processing thread to be executed; and
        responsive to intercepting a system call by the system call filter, match a value of a system call parameter to a value specified by a filtering rule.

10. The computer system of claim 9, wherein a protection key is stored in reserved bit positions of a page table entry of the plurality of page table entries.

11. The computer system of claim 9, wherein each memory access permission of the first plurality of memory access permissions comprises a bit mask including one or more bits, wherein each bit indicates a permission for the main processing thread to perform a defined memory access operation with respect to a memory region referenced by a page table entry that comprises a memory protection key indicating a position of the bit mask in the first protection key rights register.

12. The computer system of claim 11, wherein the defined memory access operation is identified by a position of the bit within the bit mask.

13. A non-transitory computer-readable storage medium comprising executable instructions that, when executed by a processing device, cause the processing device to:
   initialize, by the processing device, a plurality of memory protection keys associated with a plurality of page table entries associated with an address space of a main processing thread of a hypervisor, wherein the main processing thread coordinates an emulator processing thread associated with a virtual machine managed by the hypervisor;
   load, to a first protection key rights register associated with the main processing thread, a first plurality of memory access permissions, wherein the first plurality of memory access permissions comprise an execute permission with respect to a loadable library memory region and a code memory region, a read-write permission with respect to an emulated stack, a read-write permission with respect to an I/O stack, and a read-write permission with respect to a shared memory region;
   load, to a second protection key rights register associated with the emulator processing thread, a second plurality of memory access permissions, wherein the second plurality of memory access permissions include an execute permission with respect to the code memory region, a read-write permission with respect to the shared memory region, a read-write permission with respect to an emulated heap, and a read-write permission with respect to the emulated stack;
   initialize a system call filter to prevent the main processing thread from modifying the first protection key rights register;
   cause the main processing thread to be executed; and
   responsive to intercepting a system call by the system call filter, match a value of a system call parameter to a value specified by a filtering rule.

14. The non-transitory computer-readable storage medium of claim 13, wherein each memory access permission of the first plurality of memory access permissions comprises a bit mask including one or more bits, wherein each bit indicates a permission for the processing thread to perform a defined memory access operation with respect to a memory region referenced by a page table entry that comprises a memory protection key indicating a position of the bit mask in the first protection key rights register.

* * * * *